United States Patent
Garcia

(10) Patent No.: US 6,244,807 B1
(45) Date of Patent: Jun. 12, 2001

(54) DOUBLE SEAL NUT

(75) Inventor: Joe A. Garcia, Santa Fe Springs, CA (US)

(73) Assignee: Bristol Industries, Brea, CA (US)

(*) Notice: Subject to any disclaimer, the term of this patent is extended or adjusted under 35 U.S.C. 154(b) by 0 days.

(21) Appl. No.: 09/519,335

(22) Filed: Mar. 6, 2000

(51) Int. Cl.$^7$ .............................. F16B 33/00; F16B 43/02

(52) U.S. Cl. .................. 411/369; 411/371.1; 411/542

(58) Field of Search ................................ 411/303, 369, 411/370, 371.1, 542, 533

(56) References Cited

U.S. PATENT DOCUMENTS

| | | | |
|---|---|---|---|
| 3,399,589 | * | 9/1968 | Breed ............................ 411/542 X |
| 4,701,088 | * | 10/1987 | Crull ............................ 411/542 X |
| 5,188,495 | * | 2/1993 | Jones, Jr. ...................... 411/542 X |
| 5,393,182 | * | 2/1995 | Berecz .......................... 411/542 X |
| 5,647,710 | * | 7/1997 | Cushman ....................... 411/542 X |

OTHER PUBLICATIONS

K–Fast Systems Engineering Drawing for 5 Point, Self–Locking, Self–Sealing Nut Drawn Mar. 16, 1999.

* cited by examiner

Primary Examiner—Neill Wilson
(74) Attorney, Agent, or Firm—Morland C. Fischer

(57) ABSTRACT

A double seal nut having a wrenching element to which a torquing force is applied, an internal bore running longitudinally through the wrenching element and having a set of screw threads to be mated to a correspondingly threaded bolt by which to hold together a pair of opposing metal workpieces, and a washer base having a bearing surface to be seated flush against the faying surface of a first of the pair of workpieces. The double seal nut includes a Teflon seal ring located within the internal bore to engage the threads of the bolt and thereby block the leakage of fluid in a longitudinal (i.e. axial) direction along the bolt. The double seal nut also includes an elastomeric sealing ring that is snap-fit or molded within a circumferencial groove formed in the load bearing surface of the washer base to block the leakage of fluid from the internal bore in a radial direction along the interface between the load bearing surface of the washer base and the faying surface of the workpiece upon which the bearing surface is seated.

6 Claims, 2 Drawing Sheets

DOUBLE SEAL NUT

BACKGROUND OF THE INVENTION

1. Field of the Invention

This invention relates to a double seal nut having a first seal located within an internal bore to engage a threaded bolt and prevent leakage of fluid in an axial direction along the bolt and a second seal carried on the load bearing surface of the nut to prevent leakage in a radial direction along the interface between the load bearing surface and a workpiece upon which the load bearing surface is seated.

2. Background Art

Threaded seal nuts have long been used in industry, particularly the aerospace industry, to be mated to a correspondingly threaded bolt to hold together two typically planer and adjacent metal workpieces through which the bolt extends. It is common for a seal ring that is manufactured from a self-lubricating material (e.g. commercially known as Teflon) to be retained within a snap-in groove formed in a longitudinally extending bore through the interior of the nut. When the bolt is received within the bore of the nut, the seal ring is deformed around the threads of the bolt to prevent the leakage of fluid in a longitudinal (i.e. axial) direction along the bolt.

However, the conventional seal ring located at the interior bore of a seal nut has no effect on blocking the leakage of fluid in a radial direction along the interface between the nut and an opposing workpiece. By way of example, such liquid may be moisture originating from jet fuel carried by an aircraft. Leakage has been known to occur when an excessive torque is applied to tighten the seal nut on the bolt or as a consequence of vibrations to which the seal nut is subjected when the aircraft is in flight.

The typical solution for blocking such leakage of fluid in the radial direction is to use a sealant around the nut. In some cases, the sealant build-up is as much as ⅛ to ¼ inches thick. Not only is the process of applying the sealant expensive and time consuming, but the addition of the sealant undesirably contributes to the overall weight of the aircraft. With the large number of seal nuts used to build modern aircraft, the weight increase introduced by the volume of sealant can often be significant.

Therefore, it would be desirable for a seal nut to have the ability to prevent the leakage of fluid in both the axial direction through the internal bore of the nut and the radial direction along the bearing surface without using a sealant.

SUMMARY OF THE INVENTION

In general terms, a double seal nut is disclosed having a wrenching element to which a torquing force is applied to tighten the seal nut to a suitable bolt in order to hold together a pair of typically planer metallic workpieces that are aligned opposite one another. A washer base having a load bearing surface to be seated upon the faying surface of one of the pair of workpieces is coextensively connected to the wrenching element. An internal bore extends longitudinally through the double seal nut. The internal bore is provided with a set of screw threads that are to be mated to a correspondingly threaded bolt that extends through the pair of workpieces to be held together. A seal ring (manufactured from a self-lubricating material, such as that known commercially as Teflon) is located within a truncated conical bore formed in the internal bore of the double seal nut below the set of screw threads thereof. The seal ring is adapted to be deformed around the threads of the bolt as the double seal nut is tightened to the bolt, whereby to prevent leakage of fluid in a longitudinal (i.e. axial) direction along the bolt.

In accordance with the improvement of this invention, a sealing ring (e.g. an O-ring) is carried on the load bearing surface of the washer base of the double seal nut. The sealing ring is manufactured from an elastomeric material, such as rubber. A peripheral groove is machined or otherwise formed in the load bearing surface of the double seal nut to retain the sealing ring therewithin and surround the internal bore within which the bolt is received. Accordingly, the sealing ring prevents leakage of fluid from the internal bore in a radial direction along the interface between the load bearing surface of the double seal nut and the adjacent faying surface of the workpiece upon which the load bearing surface is seated.

DETAILED DESCRIPTION

Figure 1:
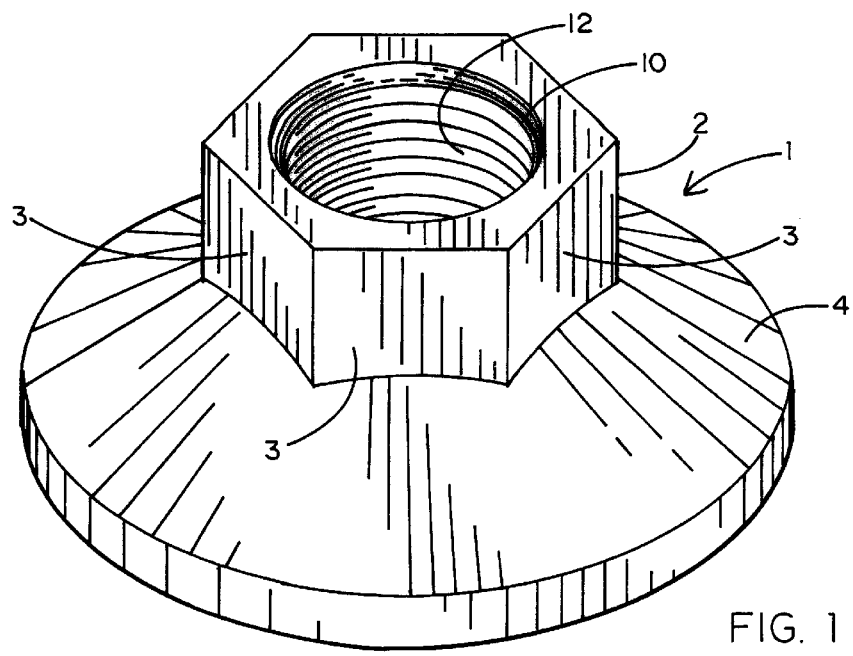
FIG. 1 is a perspective view of the double seal nut which forms the present invention.
Figure 2:
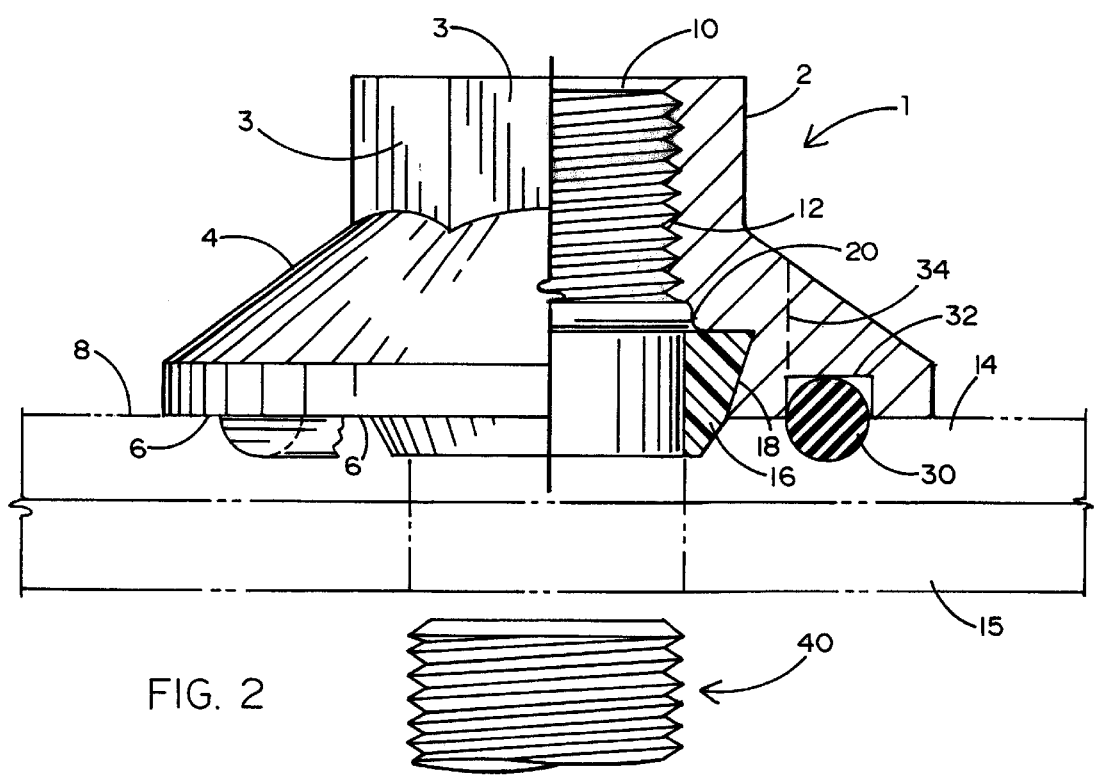
FIG. 2 is a partial cross-section of the double seal nut of FIG. 1 showing a pair of seals for preventing the leakage of fluid in both axial and radial directions.
Figure 3:
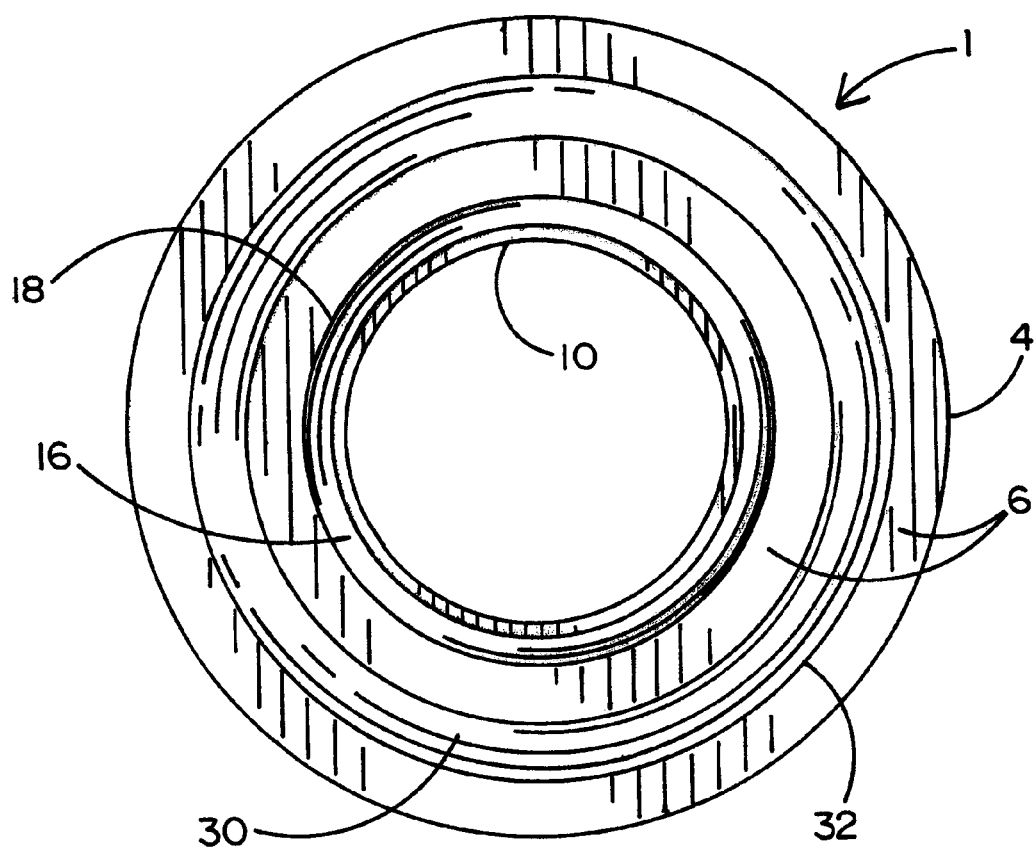
FIG. 3 is a bottom view of the double seal nut of FIG. 1.

The double seal nut 1 which forms the present invention is now described in detail while referring concurrently to FIGS. 1–3 of the drawings. As in conventional seal nuts, the double seal nut 1 is manufactured from metal (e.g. steel or aluminum) and includes a wrenching element 2 having a series of e.g. six wrench pads 3 to which a torquing force is applied to tighten nut 1 to a threaded bolt (designated 40 in FIG. 2) and a flared washer base 4 having a flat load bearing surface 6 to be held flush against an opposing faying surface (designated 8 in FIG. 2) of a workpiece 14. An internal bore 10 extends longitudinally through the double seal nut 1. The internal bore 10 has a set of screw threats 12 extending therearound to be mated to the correspondingly threaded bolt 40 so as to hold together an opposing pair of planer metallic structures (designated 14 and 15 and shown in phantom lines in FIG. 2).

As is also common to conventional seal nuts, the double seal nut 1 of this invention includes a first seal ring 16 that is snap-fit within a truncated conical bore 18 formed in the internally threaded bore 10 below the set of screw threads 12 and an intermediate counter bore relief 20. The seal ring 16 is typically manufactured from a self-lubricating material, such as that known commercially as Teflon. As will be known to those skilled in the art, the conventional Teflon seal ring 16 is adapted to be deformed and flow into the thread runout of the bolt 40 to which the double seal nut 1 is mated, whereby to prevent the leakage of fluid in a longitudinal (i.e. axial) direction along the threads of the bolt.

In accordance with the improvement of this invention, the double seal nut 1 includes a second sealing ring 30 in addition to the aforementioned seal ring 16 located within internal bore 10. Sealing ring 30 is formed from an elastomeric material such a rubber, or the like, and has an O-ring configuration (best shown in FIG. 3) to surround the internal bore 10 within which the threaded bolt 40 is received. The sealing ring 30 shown in the drawings has a thickness of 0.040 to 0.060 inches and an outside diameter of 0.40 to 0.50 inches, although the actual size of sealing ring 30 is dependent upon the size of the double seal nut 1 and the application for which the double seal nut will be used.

The sealing ring 30 is snap-fit (as shown) or molded within a circumferencial groove 32 that is machined into the load bearing surface 6 of nut 1. However, the load bearing surface 6 of double seal nut 1 may also be punched to establish the groove 32. To accommodate the circumferencial groove 32 and the sealing ring 30 therewithin, the outside diameter of the flared washer base 4 of double seal nut 1 is longer than the washer base of conventional seal nuts having only the usual seal ring 16. That is to say, the washer base of such a conventional seal nut would typically terminate at a location represented by the reference line 34 shown in FIG. 2. In the case of the double seal nut 1 of this invention, including both the usual Teflon seal ring 16 and the improved sealing ring 30, the load bearing surface 6 of the washer base 4 is relatively wide.

By virtue of the double seal nut 1 with the inclusion of sealing ring 30 as disclosed above, leakage of fluid from the internal bore 10 is blocked in the radial direction along the interface between the bearing surface 6 of nut 1 and the faying surface 8 of the opposing structure 14 upon which the load bearing surface 6 is seated. More particularly, the sealing ring 30 surrounds the bolt 40 to prevent moisture from leaking outwardly and radially from the internal bore 10 within which bolt 40 is received. Moreover, the foregoing is accomplished without the cost and inconvenience of having to add a sealant and experiencing the additional weight caused thereby as is otherwise common to conventional seal nuts.

I claim:

1. A double seal nut comprising:

a wrenching element to which a torquing force is applied;

an internal bore running longitudinally through said wrenching element and having a threaded portion to be mated to a correspondingly threaded bolt extending through a structure;

a first seal located within said internal bore and adapted to engage the threaded bolt so as to block the leakage of fluid in a longitudinal direction along the bolt;

a washer base coextensively connected to said wrenching element and having a load bearing surface to be seated flush against the structure through which the threaded bolt extends; and a second seal carried on the load bearing surface of said washer base and surrounding said internal bore to block the leakage of fluid from said internal bore in a radial direction along the interface between the load bearing surface of said washer base and the structure upon which said load bearing surface is seated.

2. The double seal nut recited in claim 1, wherein said second seal is an O-ring.

3. The double seal nut recited in claim 2, wherein said O-ring is manufactured from an elastomeric material.

4. The double seal nut recited in claim 2, further comprising a circumferencial groove formed in the load bearing surface of said washer base for receiving said O-ring therewithin.

5. The double seal nut recited in claim 4, wherein said O-ring is molded within the circumferencial groove formed in the load bearing surface of said washer base.

6. For a seal nut having a wrenching element to which a torquing force is applied, an internal bore running longitudinally through said wrenching element and having a threaded portion to be mated to a corresponding threaded bolt extending through a structure, and a washer base coextensively connected to said wrenching element and having a load bearing surface to be seated flush against the structure through which the threaded bolt extends, the improvement comprising an O-ring seal manufactured from an elastomeric material and carried on the load bearing surface of said washer base to prevent the leakage of fluid from said internal bore in a radial direction along the interface between the load bearing surface of said washer base and the structure upon which said load bearing surface is seated, and a circumferential groove formed in the load bearing surface of said washer base for receiving said O-ring seal therewithin, said circumferential groove located radially outward from said wrenching element and surrounding the internal bore through said wrenching element.

\* \* \* \* \*